United States Patent
McClellan (10) Patent No.: US 7,424,936 B2
(45) Date of Patent: Sep. 16, 2008

(54) BRAKE PAD WITH WEAR INDICATOR

(76) Inventor: William Thomas McClellan, 2480 Arbor Dr., Fort Lauderdale, FL (US) 33312

(*) Notice: Subject to any disclaimer, the term of this patent is extended or adjusted under 35 U.S.C. 154(b) by 175 days.

(21) Appl. No.: 11/281,352

(22) Filed: Nov. 17, 2005

(65) Prior Publication Data
US 2007/0107994 A1 May 17, 2007

(51) Int. Cl.
F16D 66/02 (2006.01)

(52) U.S. Cl. .............. 188/1.11 W; 188/1.11 R (58) Field of Classification Search ......... 188/1.11 R, 188/1.11 W
See application file for complete search history.

(56) References Cited

U.S. PATENT DOCUMENTS 3,056,380 A * 10/1962 White .............. 188/1.11 R
3,138,224 A * 6/1964 White .............. 188/1.11 W
3,556,046 A * 1/1971 Dombeck .......... 188/1.11 R
4,982,767 A * 1/1991 Pezzoli et al. ...... 188/1.11 W
5,511,636 A 4/1996 Tanaka

FOREIGN PATENT DOCUMENTS

| DE | 2350449 A * | 4/1975 |
| DE | 3027578 A1 * | 2/1982 |
| EP | 693635 A1 * | 1/1996 |
| GB | 2047827 A * | 12/1980 |
| GB | 2376276 A * | 12/2002 |
| JP | 2002130349 A * | 5/2002 |

OTHER PUBLICATIONS

Comp Mountain Plus Brake Pads, 1999-2004.

* cited by examiner

*Primary Examiner*—Thomas Williams
(74) *Attorney, Agent, or Firm*—Laurence A. Greenberg; Werner H. Stemer; Ralph E. Locher (57) ABSTRACT

A brake pad includes a backing plate and a friction material layer attached to the backing plate. At least one inner layer is disposed within the friction material layer. The inner layer has a color different than the friction material layer.

9 Claims, 11 Drawing Sheets

BRAKE PAD WITH WEAR INDICATOR

BACKGROUND OF THE INVENTION

1. Field of the Invention

The invention relates to a brake pad with a backing plate, a friction material layer and a wear indicator.

2. Description of the Related Art

All modern ground transportation, that is motorcycles, bicycles, automobiles, trucks, construction equipment and even airplanes during taxi, takeoff and landing, control deceleration by converting the vehicle's kinetic energy or mass velocity, into heat by a system of friction braking.

Generally a pad and a rotor or a shoe and a drum configuration are used. The pad or shoe (made of a special friction absorbing material) is connected to the vehicle, and is pressed against a metal rotor or drum attached to the rotating axle or wheel. As the friction part is pressed against the rotating part, energy is absorbed, and the vehicle decelerates.

The friction material is constructed to maximize strength, friction co-efficient and heat tolerance, but not be so hard, hot, or abrasive as to wear away at the more-expensive rotating metal rotor or drum.

The ablative friction material is sacrificial, as it is intended to be ablated or slowly used up during repeated braking applications. It is in the process of using up the friction material that braking is disturbed and catastrophic danger and damage occur. Wear-through of the brake pads can create an emergent brake failure and the resultant metal-to-metal contact can erode expensive parts.

It therefore becomes crucial for the vehicle operator to have a reliable indication of the impending wear-through. A simple, reliable, failsafe, clearly visible, low maintenance, all wheel, direct measuring contrasting color brake wear indicator would be an advancement to the art.

According to the March, 2004 issue of Consumer Reports, there are four general types of brake pads for cars and trucks. Semi-metallic pads contain metal or graphite mixed with inorganic fillers and friction modifiers for bonding. Non-asbestos organic pads have a mixture of non-asbestos fibers with filler materials and high-temperature resins.

Low-metallic NAO pads are made from an organic formula mixed with metal for heat transfer and braking. Ceramic pads have ceramic fibers, non-ferrous filler materials, bonding agents and possibly small amounts of metal. These types of pads differ in durability, heat transfer, wear, noise, dust emission and their effect on other parts of the system, such as rotors.

Thus, normal brake pad or shoe material may be a strong matrix of tough aramid fibers, rock hard, sharp edged, friction particles and heat resistant hardening resin. Brake pads suffer extremes in mechanical forces and temperatures. Their integrity depends on a uniform cohesiveness throughout the pad or shoe and an equal adhesive quality in attachment to the backing plate.

Direct measuring brake wear indicators are grooves or rivet holes cut in the pads or shoes that require partial or complete disassembly of the braking system to indicate wear level. The special equipment, expertise, and expense involved, have effectively negated the indicators having grooves or rivet holes.

Thin metal noise makers (blades or springs mounted on the pads) are only mounted on front brakes and have limited use because they are not used on rear wheels, trailers, buses, large trucks, construction equipment or airplanes. They must also be heard above the operating noise of the vehicle and their horns, radios or music system.

Indirect measuring brake wear indicators do not measure the remaining brake thickness but measure only the distance between the metal braking plate and the metal rotor or drum. They not only suffer that inaccuracy, but lack reliability and increased maintenance, inherent to their complexities of gears, cams, followers, pins, contacts, electric wires, circuit breakers and lights. They are especially failure prone in the hostile environment of the exposed wheel location, with high "G" loads, vibrations of the bouncing wheels and exposure to dirt, water, ice and road salt.

None of the prior art provides a self-test or failure warning. Wear through, brake failure and extreme repair costs are still common.

Another prior art device provides a color layer brake wear indicator. The pad or shoe is made in layers of contrasting colors. The major working thickness of the pad is standard ablative friction material that sheds the typical dark brake dust. The bottom reserve or danger zone of the pad is made of a brightly colored material that functions as an indicator by shedding a colored brake dust, which is visible on the wheel and rims. This shedding of colored material is easily visible to the operator as the vehicle is approached, fueled or cleaned. Dark dust equals normal wear and colored dust gives a clear indication of brake wear. Such a device is known from Comp Mountain dual color pads manufactured by Jagwire for mountain bikes. The prior art homogeneous colored layer is not failsafe but instead is failure prone. Two dangerous structural faults are present.

The homogeneous colored layer of soft material displaces the stronger material and a cohesive fault zone of weakness is created. Colored particles are smooth, soft and weak and the adhesiveness to the backing plate is minimal. The tremendous shear forces of braking are inline with this soft fault line, so that pad separation results and total brake failure occurs.

The homogeneous layering of soft, smooth non-friction particles also causes a sudden loss of brake efficiency once the colored layer is uncovered. The colored particles instantly coat the exposed layer with an ineffective surface of minimal friction. This soft substance acts as a lubricant, as braking friction suddenly drops and brake failure occurs.

A homogeneous colored layer used as a brake wear indicator is flawed and unacceptable.

SUMMARY OF THE INVENTION

It is accordingly an object of the invention to provide a brake pad with a wear indicator, which overcomes the hereinafore-mentioned disadvantages of the heretofore-known devices of this general type and which provides a simple, reliable, effective, failsafe, clear to the untrained, low maintenance, all wheel, direct measuring, contrasting color brake wear indicator. It is understood that all of the details of the brake pad apply equally to a bake shoe as well and that the term pad is used herein to encompass a shoe as well.

With the foregoing and other objects in view there is provided, in accordance with the invention, a brake pad, comprising a backing plate and a friction material layer attached to the backing plate. At least one inner layer is disposed within the friction material layer. The inner layer has a color different than the friction material layer. Thus, a color wear indicator is provided with no reduction in pad bonding, strength or efficiency. Although color is used as an indicator, the pad differs significantly from the prior art in material, intent and safety.

In accordance with another feature of the invention, the at least one inner layer is completely surrounded by the friction material layer. This feature maintains the integrity of the pad and does not interfere with the bonding of the friction material layer to the backing plate.

In accordance with a further feature of the invention, the at least one inner layer is at least one and preferably three arched columns. The at least one inner layer has rounded ends. This configuration of the columns is carefully planned to release more and more colored brake dust as wear increases, while maintaining the integrity of the friction material layer.

In accordance with an added feature of the invention, the at least one inner layer is formed of friction material and the friction material layer and the at least one inner layer may be formed of the same friction material.

In accordance with an additional feature of the invention, the friction material layer has a lateral extent and a vertical extent, as well as outer and inner regions and upper and lower regions. The inner layers are disposed in an outer 50% of the lateral extent and in a lower 30% of the vertical extent. In this way, slowly increasing amounts of wear-indicating colored brake dust will appear.

In accordance with a concomitant feature of the invention, the friction material layer is formed of darkly colored material and the at least one inner layer is formed of brightly colored, such as red, material. Brightly colored brake dust gives a clear indication of wear. Other features which are considered as characteristic for the invention are set forth in the appended claims.

Although the invention is illustrated and described herein as embodied in a brake pad with a wear indicator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
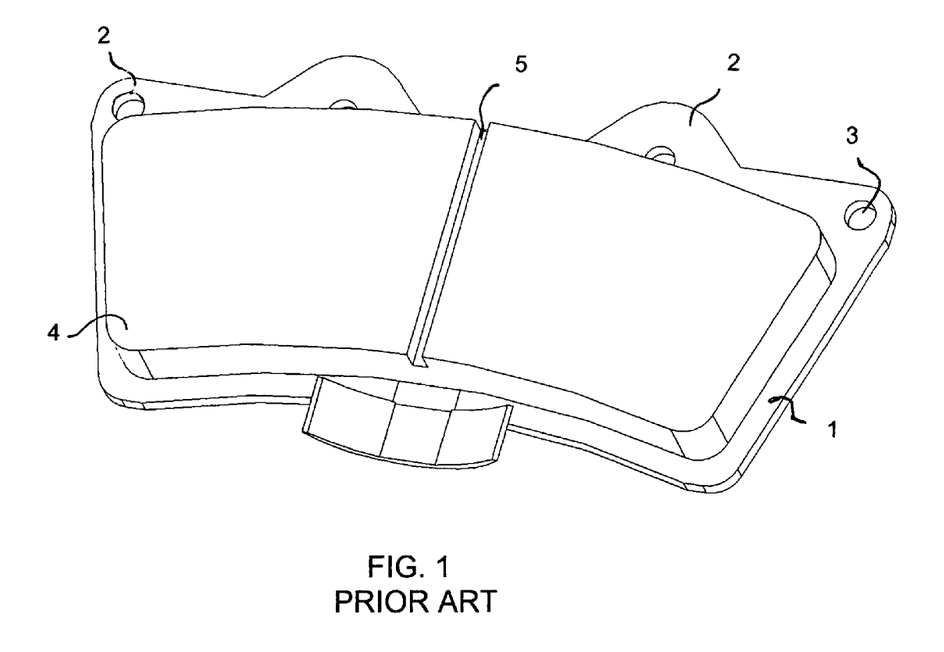
FIG. 1 is a diagrammatic, perspective view of a conventional brake pad having a wear groove.

Referring now in detail to the figures of the drawing, in which the same reference numerals have been used for similar features, and first, particularly, to FIG. 1 thereof, there is seen a prior art brake pad having a backing plate 1 with lugs 2 in which mounting holes 3 are formed. A friction material layer 4 is attached to the backing plate 1 for pressing against a rotor or drum. The friction material layer 4 is formed of a strong matrix of tough aramid fibers, rock-hard, sharp-edged, friction particles and heat-resistant hardening resin, which are specially provided for an environment encountering extremes in mechanical forces and temperatures. The integrity of the layer depends on a uniform cohesiveness throughout the layer and strong attachment to the backing plate.

A groove 5 is cut into the friction material layer 4 to indicate the wear level. Holes may also be formed in the friction material layer to provide the same wear level indication function. The wear at such grooves or holes can only be seen by at least partially disassembling the braking system.

Figure 2:
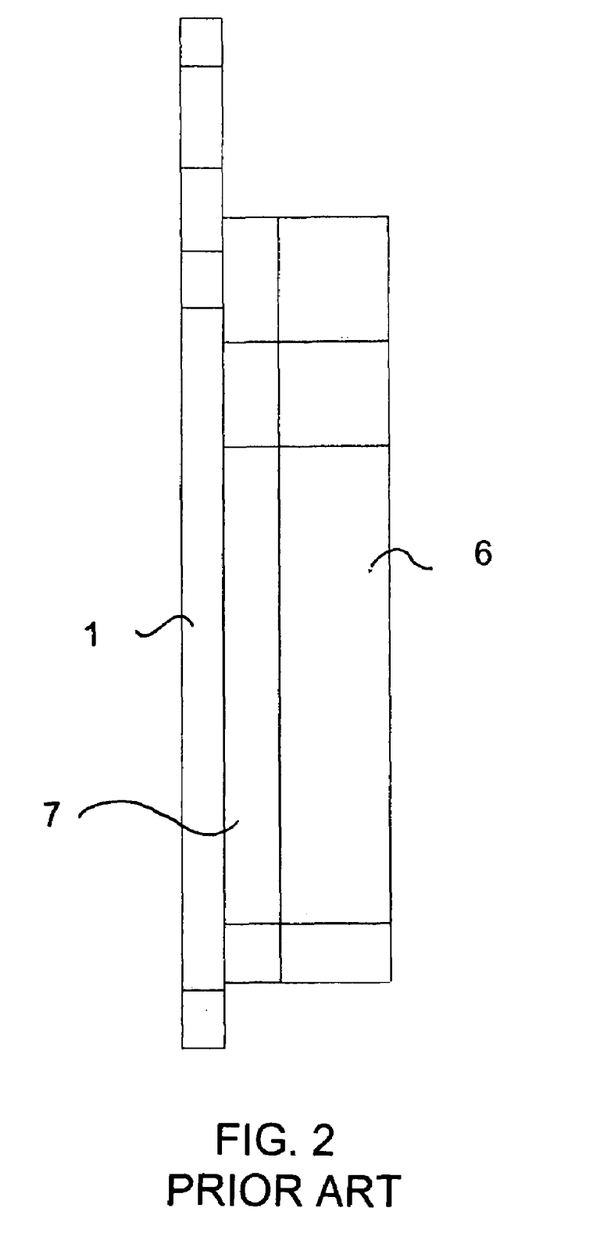
FIG. 2 is a side-elevational view of a conventional brake pad having a homogeneous inner, soft, colored layer.
Figure 3:
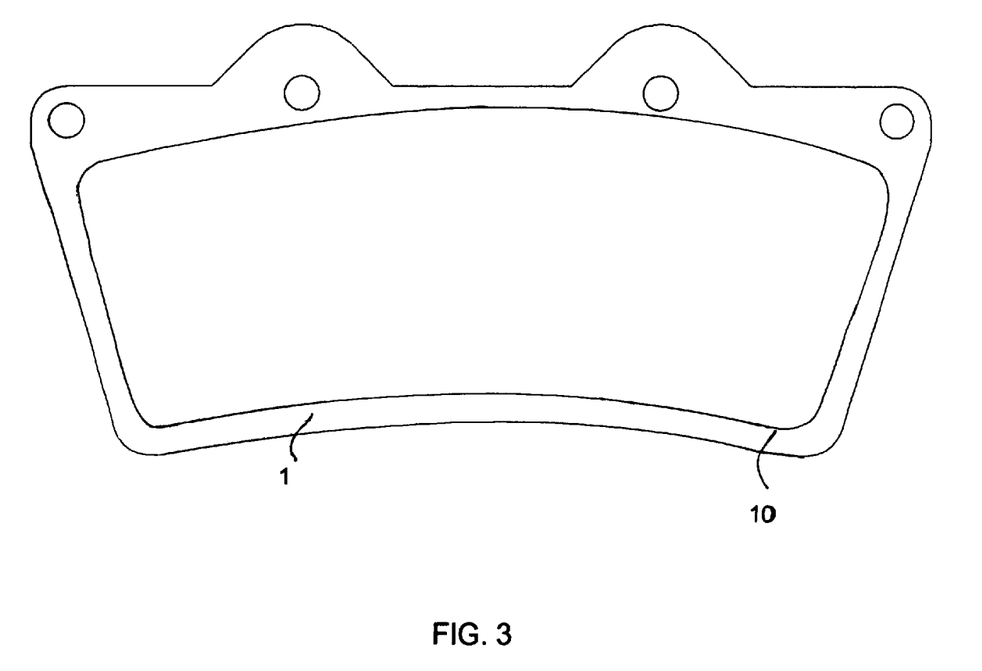
FIG. 3 is a top-plan view of a brake pad according to the invention.
Figure 4:
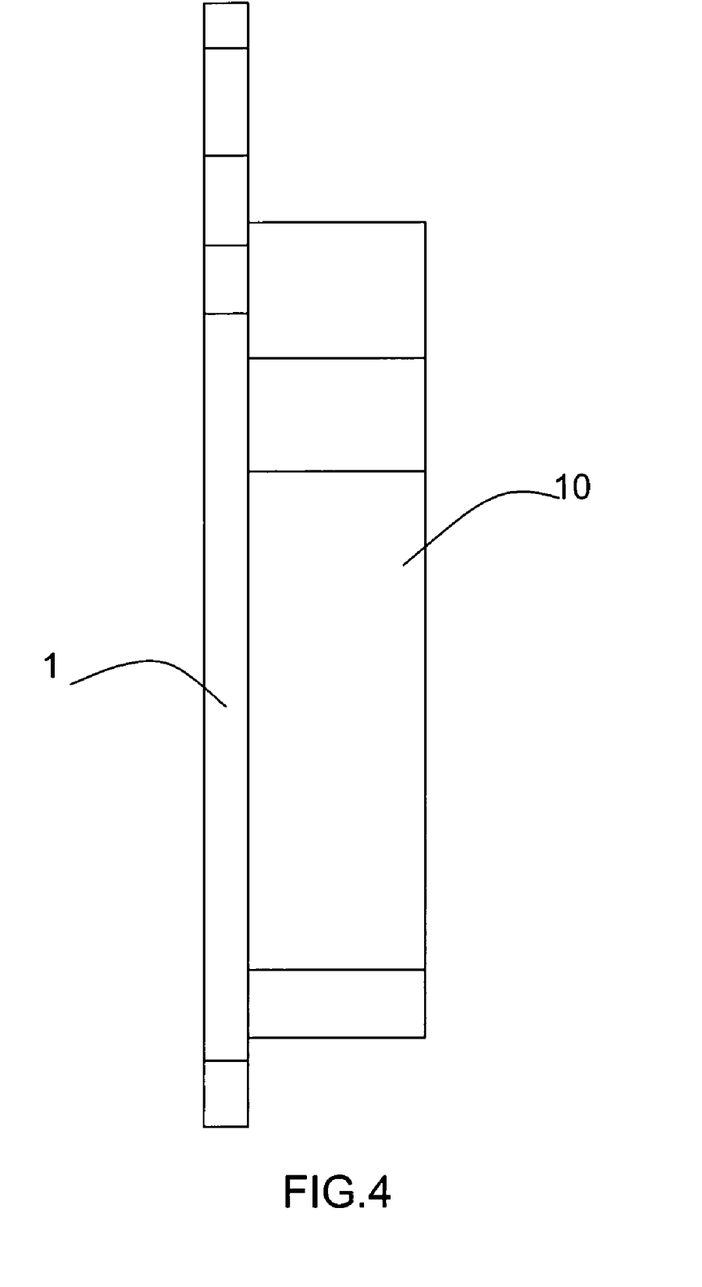
FIG. 4 is a side-elevational view of the brake pad according to the invention.
Figure 5:
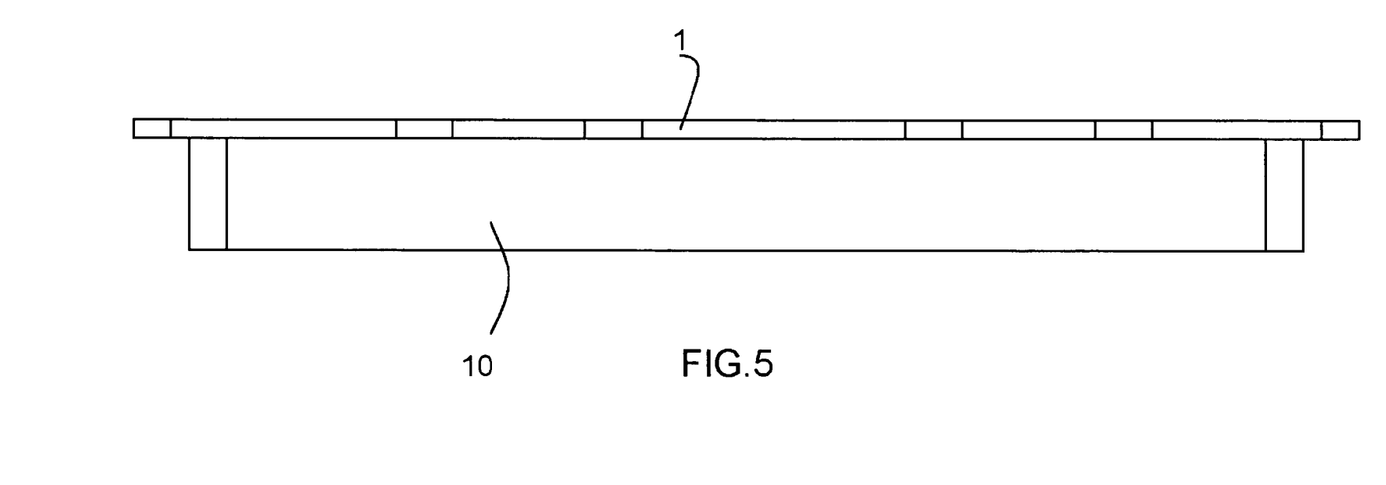
FIG. 5 is a front-elevational view of the brake pad according to the invention.
Figure 6:
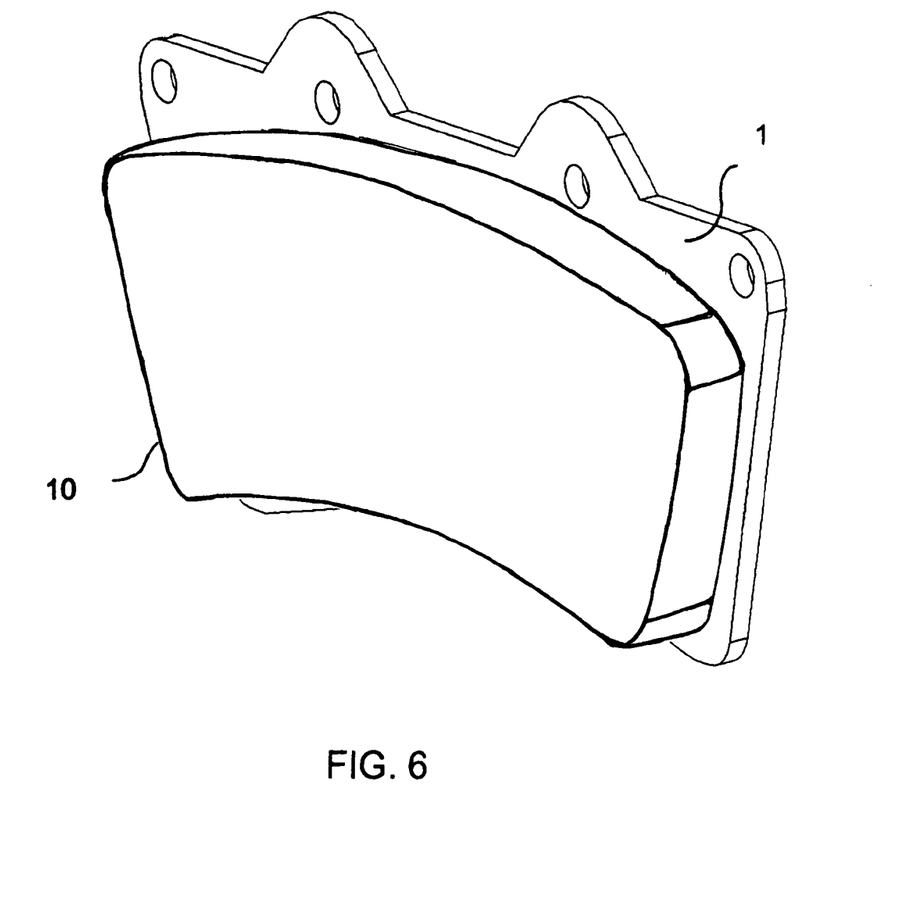
FIG. 6 is a perspective view of the brake pad according to the invention.
Figure 7:
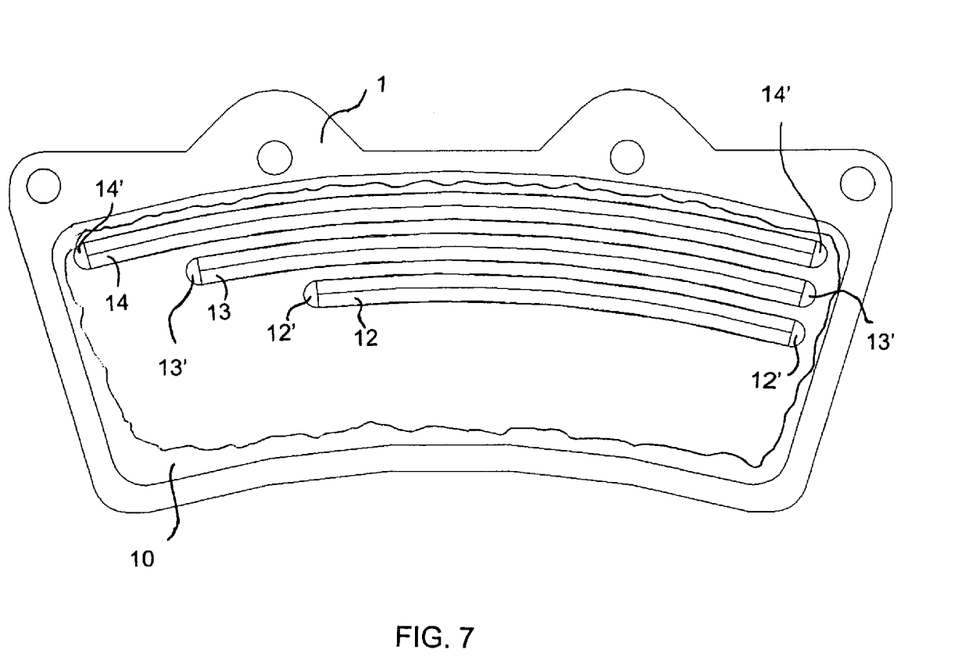
FIG. 7 is a partly broken-away, top-plan view of the brake pad according to the invention, showing enclosed contrasting color layers.
Figure 8:
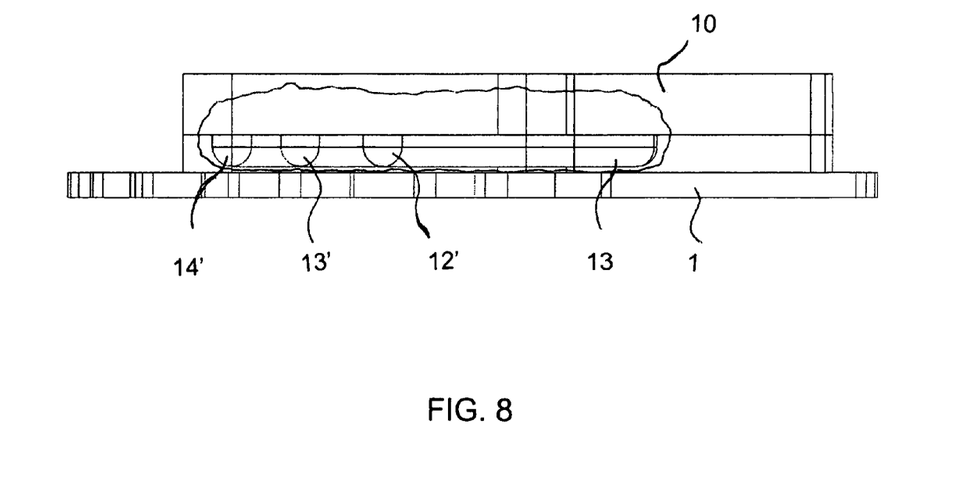
FIG. 8 is a partly broken-away, side-elevational view of the brake pad according to the invention.
Figure 9:
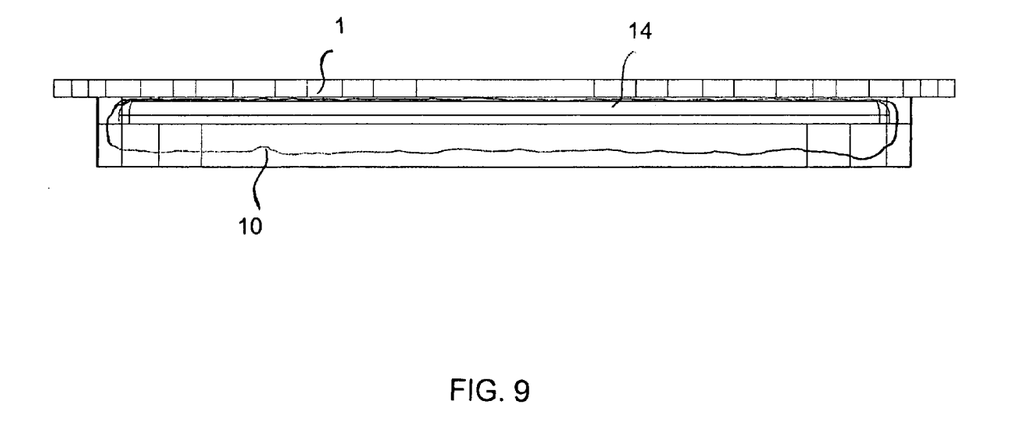
FIG. 9 is a partly broken-away, rear-elevational view of the brake pad according to the invention.

The prior art brake pad shown in FIG. 2 has an outer friction material layer 6 and an inner layer 7. While the outer layer 6 is formed of conventional ablative friction material, the inner layer 7 is formed of brightly-colored, homogeneous soft material. Therefore, the outer layer 6 sheds typical dark powder or brake dust, but when the pad wears to the inner layer 7, brightly colored powder or brake dust is shed as a warning that the pad is wearing low. The dust is visible on the wheels or rims of the vehicle.

The colored material layer 7 is formed of particles which are smooth, soft and weak as compared to the outer layer 6 and therefore create a cohesive fault zone of weakness, replacing the stronger outer layer 6. The adhesion of the particles of the inner layer 7 to the backing plate 1 is also minimal. The tremendous shear forces during braking are in line with the soft fault line created by the inner layer, so that pad separation and total brake failure can occur.

Since the colored inner layer 7 is made of homogeneous, soft, smooth, non-friction particles only permitting minimal friction, when the wear reaches that layer, a sudden loss of brake efficiency occurs once the colored layer is uncovered. The colored particles provide an ineffective surface of minimal friction, the soft substance acts as a lubricant, friction suddenly drops and brake failure can occur.

FIGS. 3, 4, 5 and 6 respectively show the brake pad according to the invention from the top, side, front and in perspective. As stated above, the elements of the brake pad apply equally to a bake shoe as well and the term pad is used herein to encompass a shoe as well. A backing plate 1 having lugs and mounting holes similar to the prior art is seen. A friction material layer 10 is attached to the backing plate 1. The outer surface of the friction material layer 10 is seen to be homogeneous in those figures.

In FIGS. 7, 8, 9, 10 and 11 the friction material layer 10 is broken-away to reveal the inner structure of that layer. It is seen that arched columns or inner layers 12, 13 and 14 are disposed within the friction material layer 10. Whereas the friction material layer 10 is formed of the normal matrix used in the friction material layer 4, the arched columns or inner layers 12, 13 and 14 are formed of colored particles selected from minerals, oxides or substances that have a hardness nearly equal to the typical friction particles of brake material. The particles of the arched columns or inner layers have strength as a primary characteristic and color as a secondary characteristic, while maintaining a good coefficient of friction. Both the friction material layer 10 and the arched columns or inner layers 12, 13 and 14 may be formed of the materials mentioned in the introduction hereto, namely semi-metallic, non-asbestos organic, low-metallic NAO or ceramic materials.

The color is added in such a way as to maintain brake pad integrity. Normal matrix structural elements are carried through the colored columns or inner layers 12-14, maintaining the structural strength, internal cohesiveness, and adhesive bonding from the backing plate 1 to the face of the friction material layer 10. The use of columns or inner layers means that the colored material is separated into small discrete compartments surrounded on all sides by the higher strength normal matrix.

Figure 10:
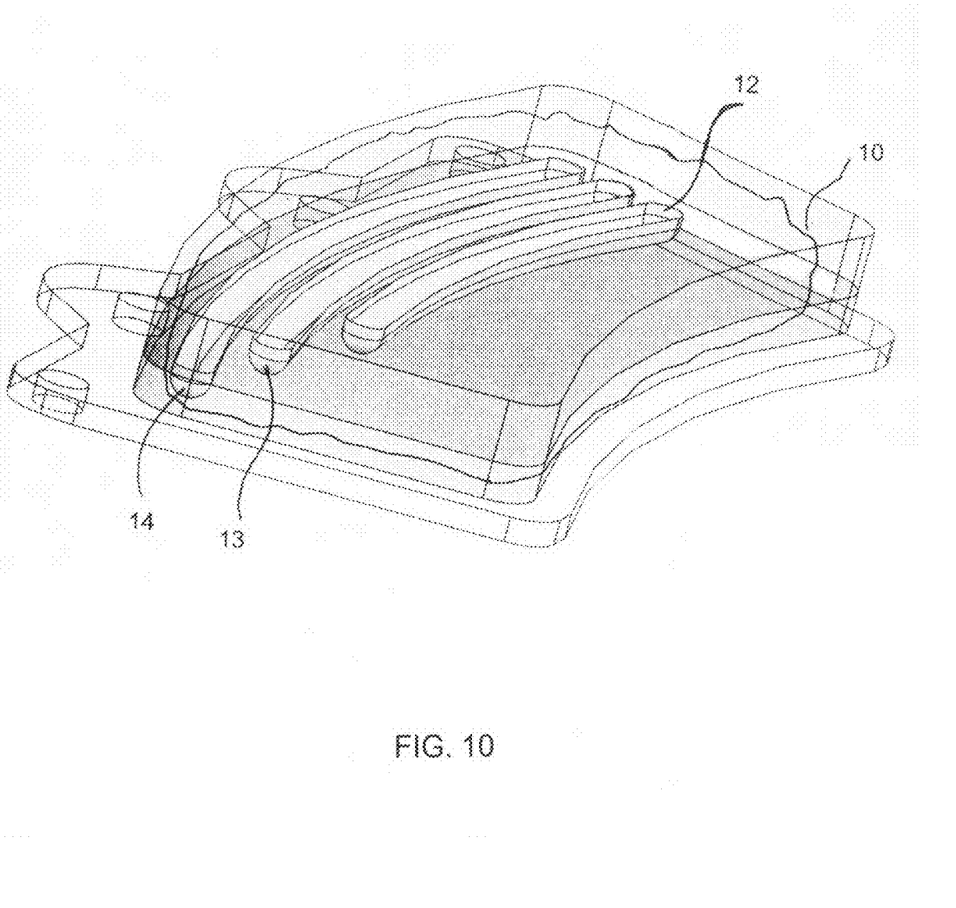
FIG. 10 is a partly broken-away, left-side perspective view of the brake pad according to the invention.
Figure 11:
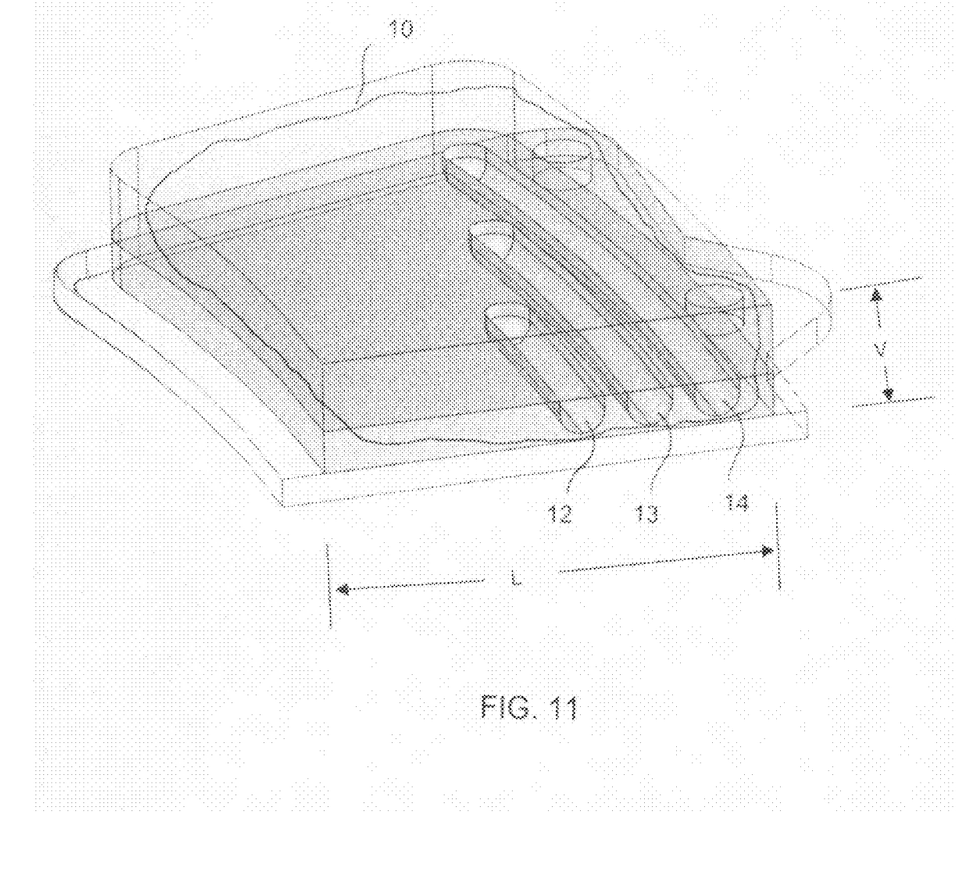
FIG. 11 is a partly broken-away, right-side perspective view of the brake pad according to the invention.

As can be seen particularly well in FIGS. 10 and 11, the color indicating material is laid out in a spreading pattern of the arched, individually divided columns or inner layers 12-14. The friction material layer 10 has outer and inner regions, upper and lower regions, a lateral extent L and a vertical extent V. The plurality of inner layers 12, 13, 14 are limited to an outer 50% of the lateral extent L and a lower 30% of the vertical extent V.

The individual colored, arched or U-shaped columns or inner layers 12, 13, 14, have rounded ends 12', 13' and 14' and are separated by vertical walls of the normal matrix, to support the color and the friction material layer 10 above. These walls are integral with and contiguous to the floor of the matrix of the friction material layer 10 that is completely bonded to the backing plate 1. The integrity of a cohesive bond between the molecules in the friction material layer 10 and an adhesive bond between the different molecules of the friction material layer 10 and the backing plate 1, is maintained.

The colored columns or inner layers are laid out longitudinally in a spreading, front to back pattern or reversed taper. This layout is intended to confine the shed particles or debris field, to the pattern of color material and to prevent the spread or contamination to the more inboard normal matrix area of the friction material layer 10. This prevents any significant reduction of braking effectiveness once the color indicators are uncovered.

The rounded ends 12'-14' of the colored columns or inner layers 12-14 stop short of the edges of the friction material layer 10 to completely surround the indicator color with a strong matrix for complete pad integrity.

The outer distribution pattern allows the normal centrifugal forces of rotation to spin or shed the color particles away from the more inner surfaces of the brake pad. Dark dust equals normal wear and colored dust gives a clear indication of brake wear.

The invention claimed is:

1. A brake pad for a wheel, comprising:
   a backing plate;
   an outer friction material layer attached to said backing plate, hidden from outside the wheel and shedding particles, visible from outside the wheel, upon being worn, said outer friction material layer having a lateral extent and a vertical extent; and
   a plurality of inner friction material layers formed of the same friction material as said outer friction material layer, disposed within and completely surrounded by said outer friction material layer for maintaining brake pad integrity, structural strength, internal cohesiveness and adhesive bonding from said backing plate to an outer face of said outer friction material layer, said plurality of inner friction material layers being hidden from outside the wheel, having a color different than said outer friction material layer and shedding particles, visible from outside the wheel, of said color different than said outer friction material layer upon being worn, said plurality of inner friction material layers being disposed only in part of said lateral extent and only in part of said vertical extent of said outer friction material layer to slowly increase and prevent an inward spread of the particles.

2. The brake pad according to claim 1, wherein said plurality of inner friction material layers are arched columns.

3. The brake pad according to claim 1, wherein said plurality of inner friction material layers have rounded ends.

4. The brake pad according to claim 1, wherein said plurality of inner friction material layers are disposed only in 50% of said lateral extent and only in 30% of said vertical extent to slowly increase and prevent an inward spread of the particles.

5. The brake pad according to claim 1, wherein said outer friction material layer has outer and inner regions and upper and lower regions, and said plurality of inner friction material layers are disposed only in an outer 50% of said lateral extent and only in a lower 30% of said vertical extent to slowly increase and prevent an inward spread of the particles.

6. The brake pad according to claim 1, wherein said outer friction material layer is formed of darkly colored material and said plurality of inner friction material layers are formed of brightly colored material.

7. The brake pad according to claim 6, wherein said brightly colored material is red.

8. A brake pad for a wheel, comprising:
   a backing plate;
   an outer friction material layer attached to said backing plate, having a lateral extent, being hidden from outside the wheel and shedding particles, visible from outside the wheel, upon being worn; and
   at least one inner friction material layer disposed within and completely surrounded by said outer friction material layer, said at least one inner friction material layer being hidden from outside the wheel, having a color different than said outer friction material layer and shedding particles, visible from outside the wheel, of said color different than said outer friction material layer upon being worn, and said at least one inner friction material layer being disposed only in approximately an outer half of said lateral extent, to slowly increase and prevent an inward spread of the particles.

9. The brake pad according to claim 8, wherein said outer friction material layer has a vertical extent, and said at least one inner friction material layer is disposed only in approximately an outer third of said vertical extent to slowly increase and prevent an inward spread of the particles.

\* \* \* \* \*